US012764839B2

(12) United States Patent
Mukai et al.

(10) Patent No.: US 12,764,839 B2
(45) Date of Patent: Oct. 13, 2026

(54) ILLUMINATION DEVICE

(71) Applicant: Panasonic Intellectual Property Management Co., Ltd., Osaka (JP)

(72) Inventors: Kenji Mukai, Osaka (JP); Naoko Takei, Osaka (JP); Ryo Okamoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 38 days.

(21) Appl. No.: 18/835,770

(22) PCT Filed: Feb. 2, 2023

(86) PCT No.: PCT/JP2023/003327
§ 371 (c)(1),
(2) Date: Aug. 5, 2024

(87) PCT Pub. No.: WO2023/157649
PCT Pub. Date: Aug. 24, 2023

(65) Prior Publication Data

US 2026/0122739 A1 Apr. 30, 2026

(30) Foreign Application Priority Data

Feb. 21, 2022 (JP) ................................. 2022-024658

(51) Int. Cl.
*H05B 45/12* (2020.01)
*F21V 23/00* (2015.01)
(Continued)

(52) U.S. Cl.
CPC ........... *H05B 45/12* (2020.01); *F21V 23/003* (2013.01); *F21Y 2113/13* (2016.08); *F21Y 2115/10* (2016.08)

(58) Field of Classification Search
CPC ... H05B 45/12; F21V 23/003; F21Y 2113/13; F21Y 2115/10
See application file for complete search history.

(56) References Cited

U.S. PATENT DOCUMENTS

2015/0049459 A1 2/2015 Peeters et al.
2016/0290573 A1* 10/2016 Allen ..................... H05B 45/20
(Continued)

FOREIGN PATENT DOCUMENTS

CN 108351536 A * 7/2018 ............... G02B 1/16
JP 2015-515133 A 5/2015
(Continued)

OTHER PUBLICATIONS

International Search Report dated Apr. 25, 2023 issued in International Patent Application No. PCT/JP2023/003327, with English translation.

(Continued)

*Primary Examiner* — Abdullah A Riyami
*Assistant Examiner* — Syed M Kaiser
(74) *Attorney, Agent, or Firm* — Rimon P.C.

(57) ABSTRACT

An illumination device is an illumination device that illuminates an object containing a fluorescent brightener and includes a light emitter that emits white light including violet light whose light emission peak wavelength that excites the fluorescent brightener is less than or equal to 405 nm. A spectral reflectance ρ(λ) is expressed by an intensity $E_A(\lambda)$/an intensity E(λ), where the intensity $E_A(\lambda)$ is an intensity of reflected light at a wavelength λ and the intensity E(λ) is an intensity of emitted light at a wavelength λ. The reflected light is light reflected off a surface of the object, and the emitted light is light emitted onto the surface of the object containing the fluorescent brightener. The maximum value of the spectral reflectance ρ(λ) at a wavelength λ

(Continued)

ranging from 460 nm to 500 nm falls between 0.9 and 1.05, both inclusive.

15 Claims, 4 Drawing Sheets

(51) Int. Cl.
*F21Y 113/13* (2016.01)
*F21Y 115/10* (2016.01)

(56) References Cited

U.S. PATENT DOCUMENTS

| | | | | |
|---|---|---|---|---|
| 2017/0111972 | A1 | 4/2017 | Oepts et al. | |
| 2019/0385029 | A1* | 12/2019 | Itagaki ............... | G06K 15/1822 |
| 2022/0034457 | A1 | 2/2022 | Lambooij et al. | |

FOREIGN PATENT DOCUMENTS

| | | | | |
|---|---|---|---|---|
| JP | 2016-004981 | A | 1/2016 | |
| JP | 2017-502493 | A | 1/2017 | |
| JP | 2017-523600 | A | 8/2017 | |
| JP | 2019-220768 | A | 12/2019 | |
| WO | 2013/150470 | A1 | 10/2013 | |
| WO | 2015/066099 | A1 | 5/2015 | |
| WO | WO-2015129500 | A1 * | 9/2015 | ............. B32B 27/36 |
| WO | 2015/189112 | A1 | 12/2015 | |

OTHER PUBLICATIONS

Extended European Search Report dated May 9, 2025 issued in the corresponding European Patent Application No. 23756176.6.

* cited by examiner

FIG. 4

| | | Illumination condition | | | | | | | | | | Criteria for evaluation |
|---|---|---|---|---|---|---|---|---|---|---|---|---|
| | | 1 | 2 | 3 | 4 | 5 | 6 | 7 | 8 | 9 | 10 | |
| Value α : Evaluation | | 0.0001 : G | 0.0002 : G | 0.0002 : G | 0.0003 : NG | 0.0004 : NG | 0.0000 : G | 0.0001 : G | 0.0001 : G | 0.0002 : G | 0.0002 : G | Good (G) → Paper appears naturally white<br>No good (NG) → Paper appears unnatural |
| Value β : Evaluation | Paper 1 | 41 : G | 41 : G | 41 : G | 41 : G | 41 : G | 40 : G | 41 : G | 41 : G | 41 : G | 40 : G | G → Words are easy to read<br>NG → Words are not easy to read |
| | Paper 2 | 24 : NG | 25 : NG | 25 : NG | 25 : NG | 25 : NG | 23 : NG | 24 : NG | 24 : NG | 24 : NG | 24 : NG | |
| | Paper 3 | 29 : G | 30 : G | 30 : G | 30 : G | 30 : G | 27 : G | 29 : G | 29 : G | 30 : G | 29 : G | |
| | Paper 4 | 27 : G | 28 : G | 29 : G | 29 : G | 29 : G | 25 : NG | 27 : G | 28 : G | 28 : G | 28 : G | |

ILLUMINATION DEVICE

CROSS-REFERENCE OF RELATED APPLICATIONS

This application is the U.S. National Phase under 35 U.S.C. § 371 of International Patent Application No. PCT/JP2023/003327, filed on Feb. 2, 2023, which in turn claims the benefit of Japanese Patent Application No. 2022-024658, filed on Feb. 21, 2022, the entire disclosure of which Applications are incorporated by reference herein.

TECHNICAL FIELD

The present disclosure relates to an illumination device that can illuminate an object.

BACKGROUND ART

For example, Patent Literature (PTL) 1 discloses a light-emitting device that can supply white light emission. This light-emitting device includes at least one first light-emitting element that has a light emission peak within a first wavelength range of from 440 nm to 460 nm and emits light having a first luminous intensity, and at least one second light-emitting element that has a light emission peak within a second wavelength range of from 380 nm to 440 nm and emits light having a second luminous intensity.

CITATION LIST

Patent Literature

[PTL 1] Japanese Unexamined Patent Application Publication (Translation of PCT Application) No. 2017-523600

SUMMARY OF INVENTION

Technical Problem

When an object is irradiated with violet light, conventional illumination devices are capable of producing a brightening effect by a fluorescent brightener contained in the object. However, these conventional illumination devices have the following problems: (i) when an object contains a low amount of a fluorescent brighter, words written on the object are difficult to read since the brightening effect produced is little, and (ii) when an object contains a high amount of the fluorescent brightener, people tend to experience great discomfort since the brightening effect produced is great.

In view of the above, the present disclosure provides an illumination device that is capable of achieving both ease of reading the words written on an object and a reduction in discomfort caused by the brightening effect.

Solution to Problem

An illumination device according to one aspect of the present disclosure is an illumination device that illuminates an object containing a fluorescent brightener. The illumination device includes a light emitter that emits white light including violet light whose light emission peak wavelength that excites the fluorescent brightener is less than or equal to 405 nm. A spectral reflectance ρ(λ) is expressed by an intensity $E_A(\lambda)$/an intensity E(λ), where the intensity $E_A(\lambda)$ is an intensity of reflected light at a wavelength λ and the intensity E(λ) is an intensity of emitted light at a wavelength λ. The reflected light is light reflected off a surface of the object, and the emitted light is light emitted onto the surface of the object containing the fluorescent brightener. The maximum value of the spectral reflectance ρ(λ) at a wavelength λ ranging from 460 nm to 500 nm falls between 0.9 and 1.05, both inclusive.

In addition, an illumination device according to one aspect of the present disclosure is an illumination device that illuminates an object containing a fluorescent brightener. The illumination device includes a light emitter that emits white light including violet light whose light emission peak wavelength that excites the fluorescent brightener is less than or equal to 405 nm. The following expression is less than a fixed value: {an integrated value of (a spectral distribution of the violet light out of the white light×a spectral luminous efficiency curve)}/{an integrated value of (a spectral distribution of light emitted by the light emitter×a spectral luminous efficiency curve)}, and the following expression is more than or equal to a fixed value: {an integrated value of (the spectral distribution of the violet light out of the white light×an absorption curve of the fluorescent brightener)}/{an integrated value of (the spectral distribution of the light emitted by the light emitter×the absorption curve of the fluorescent brightener)}.

Moreover, an illumination device according to one aspect of the present disclosure is an illumination device that illuminates an object containing a fluorescent brightener. The illumination device includes a light emitter that emits white light including violet light whose light emission peak wavelength that excites the fluorescent brightener is less than or equal to 405 nm. A ratio k of a radiant flux of the violet light to a total radiant flux is expressed by the following Expression (1), where Φp denotes an intensity of the violet light at a wavelength λ and Φw denotes the intensity of the white light at a wavelength λ. The violet light is light included in the white light emitted from the light emitter. The white light is emitted from the light emitter.

[Math. 1]

$$k = \frac{\int_{380}^{780} \phi_p(\lambda)}{\int_{380}^{780} \phi_w(\lambda) + \int_{380}^{780} \phi_p(\lambda)} \qquad \text{Expression (1)}$$

The ratio K of the radiant flux of the violet light to the total radiant flux falls between 0.02 and 0.2, both inclusive.

Note that these general or specific aspects may be implemented by any optional combination of systems, methods, integrated circuits, or the like.

Advantageous Effects of Invention

An illumination device according to the present disclosure can achieve both ease of reading the words written on an object and a reduction in discomfort caused by the brightening effect.

BRIEF DESCRIPTION OF DRAWINGS

FIG. 4 is a diagram illustrating fixed values A and B.

DESCRIPTION OF EMBODIMENTS

Note that the embodiments below each describe a general or specific example. The numerical values, shapes, materials, elements, the arrangement and connection of the elements, steps, orders of the steps, etc. presented in the embodiment below are mere examples, and are not intended to limit the present disclosure. Furthermore, among the elements in the embodiments below, those not recited in any one of the independent claims will be described as optional elements.

Hereinafter, embodiments will be described in detail with reference to the drawings.

Embodiment 1

[Configuration]

Figure 2:
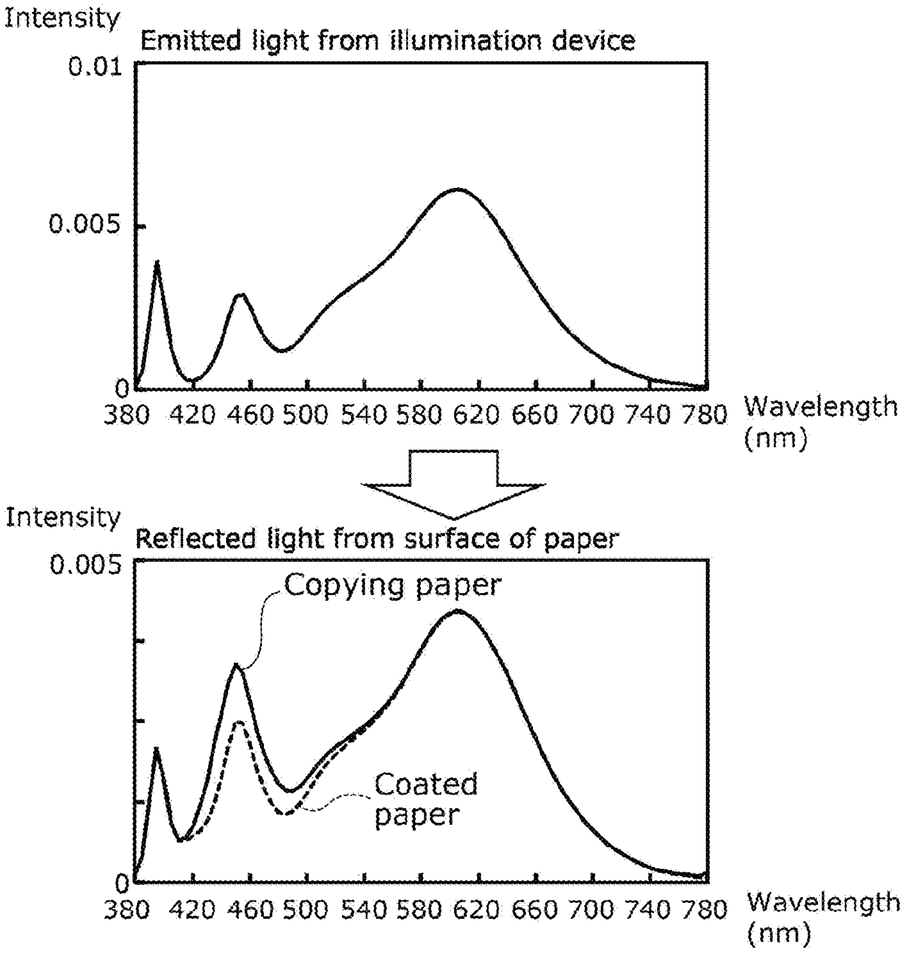
FIG. 2 is a diagram illustrating emitted light from the illumination device and reflected light from the surfaces of pieces of paper.
Figure 3:
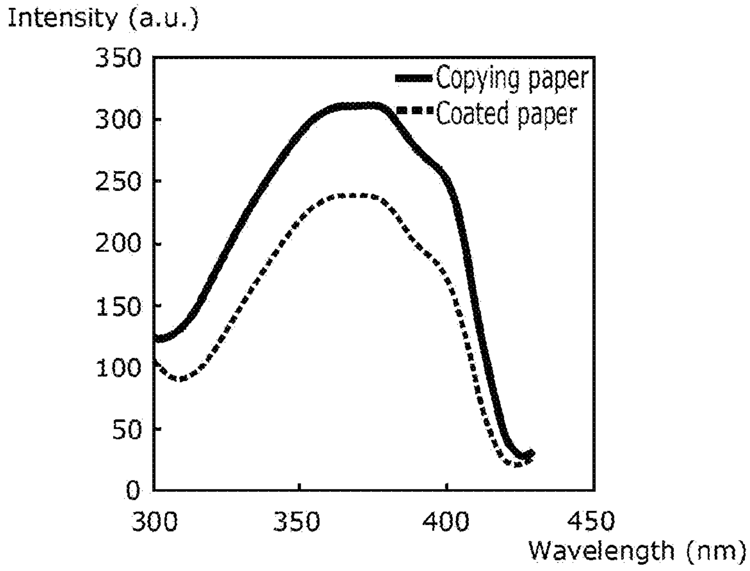
FIG. 3 is a diagram illustrating absorption curves of a fluorescent brightener.

First, the configuration of illumination device 1 according to an embodiment will be described with reference to FIG. 1 through FIG. 3.

Figure 1:
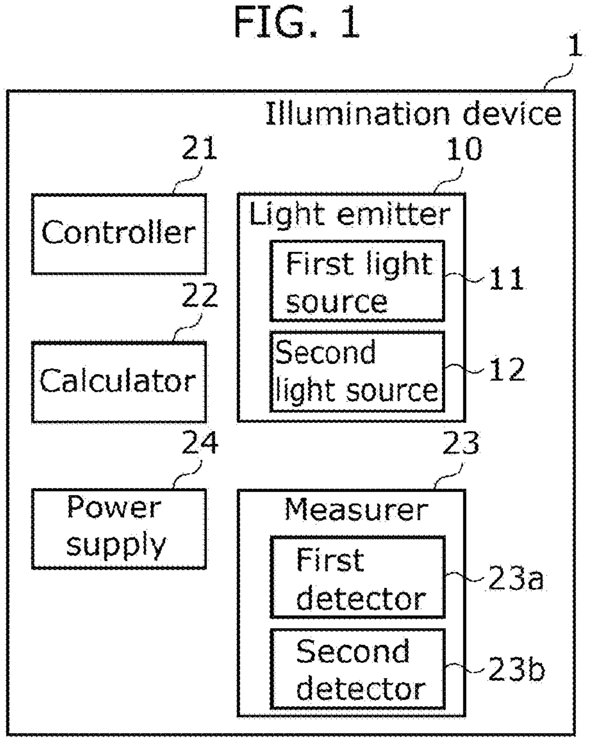
FIG. 1 is a block diagram illustrating an illumination device according to an embodiment.

FIG. 1 is a block diagram illustrating illumination device 1 according to the embodiment. FIG. 2 is a diagram illustrating emitted light from the illumination device and reflected light from the surfaces of pieces of paper. FIG. 3 is a diagram illustrating absorption curves of a fluorescent brightener.

As illustrated in FIG. 1, when illumination device 1 obtains a control signal from controller 21, illumination device 1 lights up in an illumination mode according to the control signal. For example, as a brightening and dimming function, illumination device 1 can brighten or dim the light to be emitted by a light source by adjusting the brightness of the light to be emitted to several levels. Moreover, as a toning function, illumination device 1 can emit white light ranging from white light having a low color temperature, such as soft white, to white light having a high color temperature, such as warm white, white, or neutral white. In other words, illumination device 1 can adjust the tone of light to be emitted to several levels. For example, illumination device 1 can change the color temperature by increasing or decreasing the redness of light to be emitted.

Illumination device can illuminate surroundings. More specifically, illumination device 1 illuminates an object containing a fluorescent brightener. The object containing a fluorescent brightener is, for example, a piece of paper, a sheet, etc. The fluorescent brightener has a property of reflecting blue-violet light by being excited by violet light. For this reason, when the color of an object containing the fluorescent brightener is, for example, yellow and this yellow object reflects light emitted by illumination device 1, the object appears whiter due to a mixture of blue-violet light and yellow that is the color of the object.

Illumination device 1 includes light emitter 10, controller 21, calculator 22, measurer 23, and power supply 24.

[Light Emitter 10]

Light emitter 10 emits white light including violet light whose light emission peak wavelength that excites a fluorescent brightener is less than or equal to 405 nm. For this reason, light emitter 10 can emit light that effectively excites the fluorescent brightener. The violet light is light that appears violet in color, and, more specifically, whose wavelength falls between 380 nm and 420 nm, both inclusive. White light to be emitted by light emitter 10 is emitted light from illumination device 1 shown in FIG. 2.

Light emitter 10 includes first light source 11 and second light source 12 that is an individual element different from first light source 11.

More specifically, each of first light source 11 and second light source 12 includes a board and a light-emitting diode (LED) mounted on the board.

The board is a printed circuit board on which wiring with a predetermined pattern is formed, for example. A resin board, a ceramic board, a metal board provided with insulation coating, or the like can be used as the board.

The LED of each of first light source 11 and second light source 12 is an individually packaged, surface mount device (SMD)-type light-emitting element, and includes a container (package) made of resin or the like, an LED chip (bare chip) arranged inside the container, and a sealing member that seals the LED chip. Note that a chip on board (COB)-type module in which an LED chip is directly mounted on a board may be used for each of first light source 11 and second light source 12.

In other words, the LED that first light source 11 includes is a violet LED element that emits violet light. The LED that second light source 12 includes is a white LED element that emits white light. Moreover, the correlated color temperature of white light to be emitted from second light source 12 is less than or equal to 3500 K.

Second light source 12 may include an LED that emits blue light whose light emission peak wavelength falls between 450 nm and 470 nm, both inclusive, and a phosphor appropriately selected from among a yellow phosphor, a green phosphor, and a red phosphor which are to be excited by the blue light. In the present embodiment, second light source 12 includes an LED that emits blue light, a green phosphor, and a red phosphor. In this way, second light source 12 can emit white light.

Moreover, second light source 12 may include an LED that emits blue light whose light emission peak wavelength falls between 450 nm and 470 nm, both inclusive, and a blue phosphor, a green phosphor, and a red phosphor which are to be excited by the blue light. As illustrated in FIG. 2, since the blue phosphor is excited by blue light, broad blue light can be emitted in the spectrum of light emitted by illumination device 1 and in the spectrum of light reflected off the surface of an object.

Furthermore, second light source 12 may include a blue LED that emits blue light whose light emission peak wavelength falls between 450 nm and 470 nm, both inclusive, a green LED that emits green light whose light emission peak wavelength falls between 500 nm and 550 nm, both inclusive, and a red LED that emits red light whose light emission peak wavelength falls between 600 nm and 650 nm, both inclusive. In this way, second light source 12 can emit white light.

Each of first light source 11 and second light source 12 emits light by electric power supplied from power supply 24. Power supply 24 includes, for example, a circuit board on which several circuit components are mounted. Power supply 24 receives commercial alternating-current power, converts the alternating-current power into a predetermined electric power (e.g., direct-current power), and supplies the electric power to each of first light source 11 and second light source 12. In this way, the LED of each of first light source 11 and second light source 12 emits light. Power supply 24 may be provided inside illumination device 1 or may be an individual element separated from illumination device 1.

[Measurer 23]

Measurer 23 measures the intensity of emitted light emitted by illumination device 1 and the intensity of reflected light caused by an object reflecting the emitted light emitted by illumination device 1.

More specifically, measurer 23 includes first detector 23*a* and second detector 23*b*.

First detector 23*a* is a sensor that measures the intensity of emitted light emitted by illumination device 1. More specifically, first detector 23*a* can measure an intensity E(λ) of light to be emitted onto the surface of an object containing a fluorescent brightener at a wavelength λ. First detector 23*a* outputs, to calculator 22, first intensity information that indicates the intensity of emitted light emitted by illumination device 1. The first intensity information is shown in FIG. 2 that is a diagram illustrating emitted light from illumination device 1.

Second detector 23*b* is a sensor that measures the intensity of reflected light caused by an object reflecting light emitted by illumination device 1. More specifically, second detector 23*b* can measure an intensity $E_A(\lambda)$ of the reflected light reflected off the surface of an object at a wavelength λ. The intensity $E_A(\lambda)$ includes (i) an intensity $E_p(\lambda)$ of emitted light emitted due to the excitation of a fluorescent brightener at a wavelength λ and (ii) an intensity $E_r(\lambda)$ of reflected light reflected off the surface of the object containing the fluorescent brightener without being excited by the fluorescent brightener at a wavelength λ. Second detector 23*b* may detect an intensity $E_p(\lambda)$ and an intensity $E_r(\lambda)$. Second detector 23*b* outputs, to calculator 22, second intensity information indicating an intensity of reflected light reflected off the object. The second intensity information is shown in FIG. 2 that is a diagram illustrating reflected light from the surfaces of pieces of paper, where a solid line denotes the reflected light from the surface of a piece of copying paper and a dashed line denotes the reflected light from the surface a piece of coated paper.

[Calculator 22]

Calculator 22 obtains first intensity information indicating an intensity of emitted light emitted by illumination device 1 from first detector 23*a* and second intensity information indicating an intensity of reflected light reflected off an object from second detector 23*b*, and calculates a spectral reflectance ρ(λ) based on these obtained items of information.

The spectral reflectance ρ(λ) is expressed by an intensity $E_A(\lambda)$/an intensity E(λ).

More specifically, the intensity $E_A(\lambda)$ is the sum of an intensity $E_p(\lambda)$ and an intensity $E_r(\lambda)$. Moreover, an intensity E(λ) is an intensity of emitted light to be emitted onto the surface of an object containing a fluorescent brightener at a wavelength λ. Accordingly, a spectral reflectance ρ(λ) is expressed by Expression (2) shown below.

[Math. 2]

$$p(\lambda) = \frac{E_p(\lambda) + E_r(\lambda)}{E(\lambda)} \qquad \text{Expression (2)}$$

Calculator 22 outputs a spectral reflectance ρ(λ), namely the calculated result, to controller 21.

In addition, calculator 22 may obtain the first intensity information from first detector 23*a* and the second intensity information from second detector 23*b*, and calculates a ratio k of a radiant flux of violet light to the total radiant flux, based on these obtained items of information. Calculator 22 may output the ratio k of the radiant flux of the violet light to the total radiant flux, namely the calculated result, to controller 21.

More specifically, the ratio k of the radiant flux of the violet light to the total radiant flux is expressed by Expression (3) shown below, where Φp denotes the intensity of violet light included in white light emitted from light emitter 10 at a wavelength λ, and Φw denotes the intensity of the white light emitted from light emitter 10 at a wavelength λ.

[Math. 3]

$$k = \frac{\int_{380}^{780} \phi_p(\lambda)}{\int_{380}^{780} \phi_w(\lambda) + \int_{380}^{780} \phi_p(\lambda)} \qquad \text{Expression (3)}$$

Moreover, calculator 22 may obtain the first intensity information from first detector 23*a* and the second intensity information from second detector 23*b*, and calculates the following expressions (i) and (ii) based on these obtained items of information: (i) {an integrated value of (the spectral distribution of only violet light out of white light×a spectral luminous efficiency curve)}/{an integrated value of (the spectral distribution of light emitted by light emitter 10×the spectral luminous efficiency curve)} and (ii) {an integrated value of (the spectral distribution of only violet light out of white light×an absorption curve of a fluorescent brightener)}/{an integrated value of (the spectral distribution of light emitted by light emitter 10×the absorption curve of the fluorescent brightener)}. Calculator 22 may output the calculated results to controller 21. Here, FIG. 3 illustrates the absorption curves of a fluorescent brightener. Calculator 22 may use FIG. 3 to calculate an integrated value of the fluorescent brightener contained in the piece of copying paper and the piece of coated paper.

[Controller 21]

Based on a result calculated by calculator 22, controller 21 individually controls first light source 11 and second light source 12 in controlling the brightening and dimming of light to be emitted from first light source 11 and second light source 12.

More specifically, controller 21 controls the brightening and dimming of light to be emitted from first light source 11 and second light source 12 by adjusting, based on a spectral reflectance ρ(λ) calculated by calculator 22, an output ratio between first light source 11 and second light source 12 so that the maximum value of the spectral reflectance ρ(λ) at a wavelength λ ranging from 460 nm to 500 nm falls between 0.9 and 1.05, both inclusive. As described above, controller 21 automatically adjusts the output ratio between first light source 11 and second light source 12, based on the spectral reflectance ρ(λ). When the maximum value of the spectral reflectance ρ(λ) at the wavelength λ ranging from 460 nm to 500 nm is less than 0.9, it is unlikely that an object appears white in color since a fluorescent brightening effect produced by a fluorescent brightener contained in the object is little. This causes words written on the object difficult to read. In addition, when the maximum value of the spectral reflectance ρ(λ) at the wavelength λ ranging from 460 nm to 500 nm is more than 1.05, the object appears overly white in color since the fluorescent brightening effect produced by the fluorescent brightener contained in the object is great. This causes a user to experience discomfort.

Controller 21 may also adjust an output ratio between first light source 11 and second light source 12 according to the type and amount of the fluorescent brightener contained in the object. For example, when the fluorescent brightener is of a less brightening effect type and the object has a low amount of the fluorescent brightener, there is a possibility that the words on the object are difficult to read. Conversely, when the fluorescent brightener is of a great brightening effect type and the object has a high amount of the fluorescent brightener, there is a possibility that the whiteness of the object is overly distinctive. For this reason, controller 21 may adjust an output ratio between first light source 11 and second light source 12 with consideration given to the type and amount of a fluorescent brightener, so that the maximum value of a spectral reflectance $\rho(\lambda)$ at the wavelength $\lambda$ ranging from 460 nm to 500 nm falls between 0.9 and 1.05, both inclusive.

Controller 21 may also automatically adjust the output ratio between first light source 11 and second light source 12 so that a ratio k of a radiant flux of violet light to the total radiant flux, which is calculated by calculator 22, falls between 0.02 and 0.2, both inclusive. When the ratio k of the radiant flux of the violet light to the total radiant flux is less than 0.02, it is unlikely that an object appears white in color since the fluorescent brightening effect produced by a fluorescent brightener contained in the object is little. This causes words written on the object difficult to read. Conversely, when the ratio k of the radiant flux of the violet light to the total radiant flux is more than 0.2, the object appears overly white in color since the fluorescent brightening effect produced by the fluorescent brightener contained in the object is great. This causes a user to experience discomfort.

Moreover, controller 21 may automatically adjust an output ratio between first light source 11 and second light source 12 so that (i) a value $\alpha$ derived from the expression {an integrated value of (the spectral distribution of only violet light out of white light×a spectral luminous efficiency curve)}/{an integrated value of (the spectral distribution of light emitted by light emitter 10×the spectral luminous efficiency curve)} is less than a fixed value A and (ii) a value $\beta$ derived from the expression {an integrated value of (the spectral distribution of only violet light out of white light×an absorption curve of a fluorescent brightener)}/{an integrated value of (the spectral distribution of light emitted by light emitter 10×the absorption curve of the fluorescent brightener)} is more than or equal to a fixed value B. The values $\alpha$ and $\beta$ are calculated by calculator 22. Here, the fixed value A is, for example, 0.0003, and the fixed value B is, for example, 26.

The basis for deriving, from experimental results, the fixed values A and B each of which serves as a reference value is as shown in FIG. 4. FIG. 4 is a diagram illustrating the fixed values A and B.

FIG. 4 shows the results of determining, under ten illumination conditions that have been set, whether (i) a piece of paper appears naturally white in color and (ii) words written on pieces of paper are easy to read.

When a value $\alpha$ was calculated, whether a piece of paper appears naturally white in color or not was determined under the ten illumination conditions.

For example, the value $\alpha$ indicating 0.0000 under illumination condition 6 was marked with "G" (indicating good) since the piece of paper appeared naturally white in color.

Next, the values $\alpha$ indicating 0.0001 under illumination conditions 1, 7, and 8 were marked with G since the piece of paper also appeared naturally white in color.

Next, the values $\alpha$ indicating 0.0002 under illumination conditions 2, 3, 9, and 10 were marked with G since the piece of paper also appeared naturally white in color.

Next, the value $\alpha$ indicating 0.0003 under illumination condition 4 was marked with "NG" (indicating no good) since the piece of paper appeared unnatural.

Next, the value $\alpha$ indicating 0.0004 under illumination condition 5 was marked with NG since the piece of paper appeared unnatural.

From the above, the fixed value A was determined to be 0.0003.

When a value $\beta$ was calculated, four types of paper indicated as papers 1 to 4 were used to determine whether words written on these papers are easy to read under the ten illumination conditions.

For example, the values $\beta$ of papers 1, 3, and 4 indicating 41, 29, and 27, respectively, under illumination conditions 1 and 7 were marked with G since the words were easy to read. However, value $\beta$ of paper 2 indicating 24 was marked with NG since the words were not easy to read.

The values $\beta$ of papers 1, 3, and 4 indicating 41, 30, and 28, respectively, under illumination condition 2 were marked with G since the words were easy to read. However, the value $\beta$ of paper 2 indicating 25 was marked with NG since the words were not easy to read.

The values $\beta$ of papers 1, 3, and 4 indicating 41, 30, and 29, respectively, under illumination conditions 3 through 5 were marked with G since the words were easy to read. However, the value $\beta$ of paper 2 indicating 25 was marked with NG since the words were not easy to read.

The values $\beta$ of papers 1 and 3 indicating 40 and 27, respectively, under illumination condition 6 were marked with G since the words were easy to read. However, the values $\beta$ of papers 2 and 4 indicating 23 and 25, respectively, were marked with NG since the words were not easy to read.

The values $\beta$ of papers 1, 3, and 4 indicating 41, 29, and 28, respectively, under illumination condition 8 were marked with G since the words were easy to read. However, the value $\beta$ of paper 2 indicating 24 was marked with NG since the words were not easy to read.

The values $\beta$ of papers 1, 3, and 4 indicating 41, 30, and 28, respectively, under illumination condition 9 were marked with G since the words were easy to read. However, the value $\beta$ of paper 2 indicating 24 was marked with NG since the words were not easy to read.

The values $\beta$ of papers 1, 3, and 4 indicating 40, 29, and 28, respectively, under illumination condition 10 were marked with G since the words were easy to read. However, the value 1 of paper 2 indicating 24 was marked with NG since the words were not easy to read.

From the above, the fixed value B was determined to be 26.

Note that when controller 21 obtains a result calculated by calculator 22, controller 21 may output information indicating an output ratio between first light source 11 and second light source 12 to an external device such as a display device. In this case, a user may operate illumination device 1 according to the information displayed on the display device indicating the output ratio between first light source 11 and second light source 12.

[Power Supply 24]

Power supply 24 supplies electric power to first light source 11, second light source 12, etc. to control the output of light. In other words, power supply 24 generates driving power for causing first light source 11, second light source 12, etc. to drive, and supplies the generated driving power to each of first light source 11, second light source 12, etc.

[Processing Operation]

Figure 5:
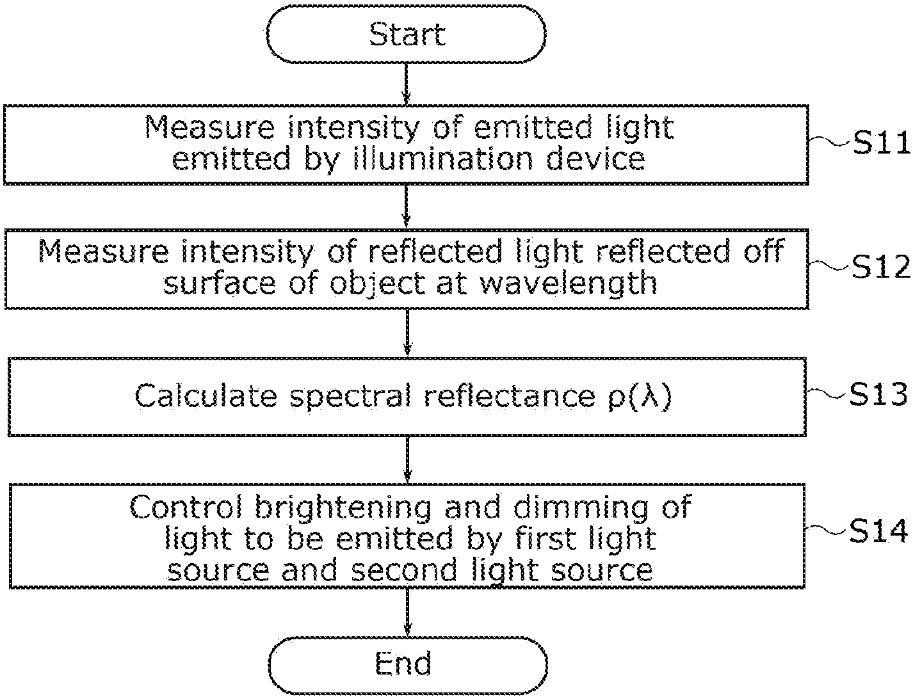
FIG. 5 is a flowchart illustrating processing operations performed by the illumination device according to the embodiment.

FIG. 5 is a flowchart illustrating processing operations performed by illumination device 1 according to the embodiment.

First, as illustrated in FIG. 5, first detector 23*a* measures the intensity of emitted light emitted by illumination device 1 (S11). In other words, first detector 23*a* measures an intensity E(λ) of the emitted light emitted onto the surface of an object containing a fluorescent brightener at a wavelength λ.

Next, second detector 23*b* measures the intensity of light that is the light emitted by illumination device 1 and reflected off the surface of the object (S12). In other words, second detector 23*b* measures an intensity $E_A(\lambda)$ of reflected light reflected off the surface of the object at a wavelength λ. Note that second detector 23*b* may estimate an intensity $E_p(\lambda)$ of emitted light emitted due to excitation of the fluorescent brightener at a wavelength λ and an intensity $E_r(\lambda)$ of reflected light reflected off the surface of the object containing the fluorescent brightener at a wavelength λ. First detector 23*a* outputs, to calculator 22, first intensity information that indicates the intensity of the emitted light emitted by illumination device 1. Second detector 23*b* outputs, to calculator 22, second intensity information indicating the intensity of the reflected light reflected off the object.

Next, calculator 22 calculates, based on the first intensity information and second intensity information, a spectral reflectance ρ(λ) using Expression (2) (S13). Calculator 22 outputs the spectral reflectance ρ(λ), namely the calculated result, to controller 21.

Although step S13 exemplified the calculation of a spectral reflectance ρ(λ), this example is non-limiting. For example, calculator 22 may calculate, based on the first intensity information and second intensity information, a ratio k of radiant flux of violet light to the total radiant flux using Expression (3). Calculator 22 may output the ratio k of the radiant flux of the violet light to the total radiant flux, namely the calculated result, to controller 21.

Moreover, calculator 22 may calculate, based on the first intensity information and second intensity information, a value α and a value β from the following expressions (i) and (ii), respectively: (i) {an integrated value of (the spectral distribution of only violet light out of white light×a spectral luminous efficiency curve)}/{an integrated value of (the spectral distribution of light emitted by light emitter 10×the spectral luminous efficiency curve)} and (ii) {an integrated value of (the spectral distribution of only violet light out of white light×an absorption curve of a fluorescent brightener) }/{an integrated value of (the spectral distribution of light emitted by light emitter 10×the absorption curve of the fluorescent brightener)}. Calculator 22 may output the values α and β, namely the calculated results, to controller 21.

Next, controller 21 controls the brightening and dimming of light to be emitted from first light source 11 and second light source 12 by adjusting, based on the spectral reflectance ρ(λ) that is the result calculated by calculator 22, an output ratio between first light source 11 and second light source 12 so that the maximum value of the spectral reflectance ρ(λ) at the wavelength λ ranging from 460 nm to 500 nm falls between 0.9 and 1.05, both inclusive (S14).

Note that controller 21 may also control the brightening and dimming of light to be emitted from first light source 11 and second light source 12 by adjusting, based on the result calculated by calculator 22, the output ratio between first light source 11 and second light source 12 so that a ratio k of a radiant flux of violet light to the total radiant flux falls between 0.02 and 0.2, both inclusive.

Furthermore, controller 21 may also control the brightening and dimming of light to be emitted from first light source 11 and second light source 12 by adjusting, based on the result calculated by calculator 22, the output ratio between first light source 11 and second light source 12 so that a value α is less than a fixed value and a value β is more than or equal to a fixed value.

Thereafter, illumination device 1 ends the processing shown in FIG. 5.

Advantageous Effects

Next, advantageous effects produced by illumination device 1 according to the present embodiment will be described.

Figure 6:
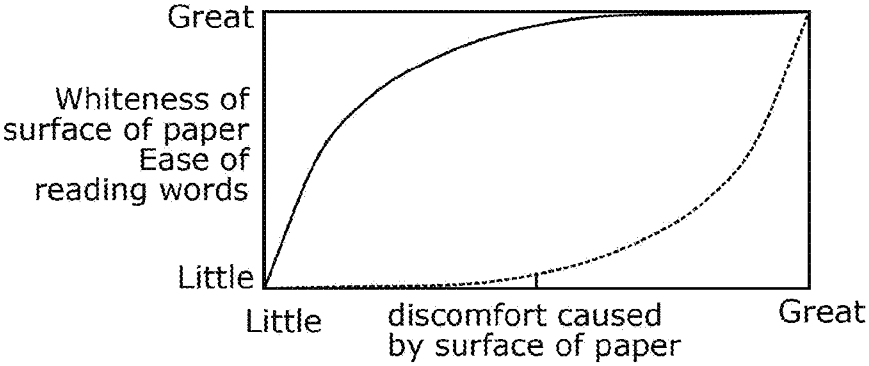
FIG. 6 is a diagram illustrating a relationship between ease of reading words and discomfort caused by the surface of a piece of paper, when an object is the piece of paper.

FIG. 6 is a diagram illustrating a relationship between ease of reading words and discomfort caused by the surface of a piece of paper, when an object is the piece of paper. As illustrated in FIG. 6, when the object contains a low amount of a fluorescent brightener, it is unlikely that the surface of the piece of paper appears white in color and thus words are difficult to read. Conversely, when the piece of paper contains a high amount of the fluorescent brightener, the surface of the piece of paper appears overly white in color due to the brightening effect. This distinctive whiteness causes a user to experience discomfort. In view of the above, there is a demand for achieving both ease of reading the words written on an object and a reduction in discomfort caused by the brightening effect.

In view of the above, illumination device 1 according to the present embodiment is an illumination device that illuminates an object containing a fluorescent brightener, and includes light emitter 10 that emits white light including violet light whose light emission peak wavelength that excites the fluorescent brightener is less than or equal to 405 nm. In addition, a spectral reflectance ρ(λ) is expressed by an intensity $E_A(\lambda)$/an intensity E(λ), where the intensity $E_A(\lambda)$ is an intensity of reflected light at a wavelength λ and the intensity E(λ) is an intensity of emitted light at a wavelength λ. The reflected light is light reflected off a surface of the object, and the emitted light is light emitted onto the surface of the object containing the fluorescent brightener. The maximum value of the spectral reflectance ρ(λ) at a wavelength λ ranging from 460 nm to 500 nm falls between 0.9 and 1.05, both inclusive.

According to the above, when violet light is emitted onto the object, the fluorescent brightener excited by the violet light can emit blue light. For example, when the object is yellow, the object appears white in color due to a mixture of yellow and the emitted blue light. The object appears white in color since the maximum value of the spectral reflectance ρ(λ) at the wavelength λ ranging from 460 nm to 500 nm is not less than 0.9. Accordingly, words written on the object are easy to read. In addition, the object does not appear overly white in color since the maximum value of the spectral reflectance ρ(λ) at the wavelength λ ranging from 460 nm to 500 nm is not more than 1.05. Accordingly, it is unlikely to cause a user to experience discomfort caused by the brightening effect.

Therefore, illumination device 1 is capable of achieving both ease of reading the words written on an object and a reduction in discomfort caused by the brightening effect.

In addition, illumination device 1 according to the present embodiment is an illumination device that illuminates an object containing a fluorescent brightener, and includes light emitter 10 that emits white light including violet light whose light emission peak wavelength that excites the fluorescent brightener is less than or equal to 405 nm. The following expression is less than a fixed value: {an integrated value of (a spectral distribution of the violet light out of the white light×a spectral luminous efficiency curve)}/{an integrated value of (a spectral distribution of light emitted by the light emitter×a spectral luminous efficiency curve)}, and the following expression is more than or equal to a fixed value: {an integrated value of (the spectral distribution of the violet light out of the white light×an absorption curve of the fluorescent brightener)}/{an integrated value of (the spectral distribution of the light emitted by the light emitter×the absorption curve of the fluorescent brightener)}.

This illumination device 1 also produces the same advantageous effects as described above.

Moreover, illumination device 1 according to the present embodiment is an illumination device that illuminates an object containing a fluorescent brightener, and includes light emitter 10 that emits white light including violet light whose light emission peak wavelength that excites the fluorescent brightener is less than or equal to 405 nm. A ratio k of a radiant flux of the violet light to a total radiant flux is expressed by the following Expression (4), where Φp denotes an intensity of the violet light at a wavelength λ and Φw denotes the intensity of the white light at a wavelength λ. The violet light is included in the white light emitted from the light emitter, and the white light is emitted from the light emitter.

[Math. 4]

$$k = \frac{\int_{380}^{780} \phi_p(\lambda)}{\int_{380}^{780} \phi_w(\lambda) + \int_{380}^{780} \phi_p(\lambda)} \qquad \text{Expression (4)}$$

The ratio k of the radiant flux of the violet light to the total radiant flux falls between 0.02 and 0.2, both inclusive.

This illumination device 1 produces the same advantageous effects as described above.

Moreover, in illumination device 1 according to the present embodiment, the intensity $E_A(\lambda)$ is a sum of an intensity $E_p(\lambda)$ of emitted light at a wavelength λ and an intensity $E_r(\lambda)$ of reflected light at a wavelength λ. The emitted light is light emitted due to excitation of the fluorescent brightener, and the reflected light is light reflected off the surface of the object containing the fluorescent brightener.

According to the above, it is possible to estimate an intensity $E_p(\lambda)$ and an intensity $E_r(\lambda)$ according to a property of the fluorescent brightener.

In addition, in illumination device 1 according to the present embodiment, light emitter 10 includes first light source 11 that emits the violet light, and second light source 12 that is an individual element different from first light source 11 and emits the white light.

According to the above, first light source 11 and second light source 12 can be individually controlled. Accordingly, the intensity of white light and the intensity of violet light can be adjusted.

Moreover, in illumination device 1 according to the present embodiment, first light source 11 includes an LED.

According to the above, first light source 11 using an LED can emit violet light.

In addition, in illumination device 1 according to the present embodiment, first light source 11 includes an LED that emits the violet light, and second light source 12 includes an LED that emits the white light.

According to the above, first light source 11 using an LED can emit violet light. In addition, second light source 12 using an LED can emit white light. Moreover, first light source 11 and second light source 12 can be individually controlled.

Moreover, in illumination device 1 according to the present embodiment, second light source 12 includes an LED that emits blue light whose light emission peak wavelength falls between 450 nm and 470 nm, both inclusive, and a phosphor appropriately selected from among a yellow phosphor, a green phosphor, and a red phosphor which are to be excited by the blue light.

According to the above, the use of one or more phosphors enables second light source 12 to emit white light.

In addition, in illumination device 1 according to the present embodiment, second light source 12 includes an LED that emits blue light whose light emission peak wavelength falls between 450 nm and 470 nm, both inclusive, and a blue phosphor, a green phosphor, and a red phosphor which are to be excited by the blue light.

According to the above, since the blue phosphor excited by blue light emits light whose wavelength falls between 450 nm and 470 nm, both inclusive, light whose wavelength falls between 450 nm and 470 nm, both inclusive, can be increased. With this, white light including broader blue light can be emitted.

Moreover, in illumination device 1 according to the present embodiment, second light source 12 includes a blue LED that emits blue light whose light emission peak wavelength falls between 450 nm and 470 nm, both inclusive, a green LED that emits green light whose light emission peak wavelength falls between 500 nm and 550 nm, both inclusive, and a red LED that emits red light whose light emission peak wavelength falls between 600 nm and 650 nm, both inclusive.

According to the above, second light source 12 including a blue LED, a green LED, and a red LED can emit white light.

In addition, illumination device 1 according to present embodiment further includes controller 21 that individually controls first light source 11 and second light source 12 in controlling brightening and dimming of light to be emitted by first light source 11 and second light source 12. Controller 21 adjusts, according to a type and an amount of the fluorescent brightener contained in the object, an output ratio between first light source 11 and second light source 12 to cause the maximum value of the spectral reflectance ρ(λ) at the wavelength λ ranging from 460 nm to 500 nm to fall between 0.9 and 1.05, both inclusive.

According to the above, controller 21 can automatically adjust the output ratio between first light source 11 and second light source 12 according to the type and amount of the fluorescent brightener. For this reason, words written on the object are easy to read and discomfort caused by the brightening effect can further be reduced.

Moreover, illumination device 1 according to present embodiment further includes measurer 23 that measures the intensity E(λ) and the intensity $E_A(\lambda)$, and calculator 22 that calculates the spectral reflectance ρ(λ).

According to the above, it is possible to accurately measure an intensity E(λ) of light emitted by illumination device 1 and an intensity $E_A(\lambda)$. With this, a spectral reflectance $\rho(\lambda)$ can be accurately calculated, and thus an output ratio between first light source 11 and second light source 12 can be more appropriately adjusted. As a result, words written on the object are easy to read and discomfort caused by the brightening effect can further be reduced.

In addition, in illumination device 1 according to the present embodiment, controller 21 adjusts, based on the spectral reflectance $\rho(\lambda)$ calculated by calculator 22, the output ratio between first light source 11 and second light source 12 to cause the maximum value of the spectral reflectance $\rho(\lambda)$ at the wavelength $\lambda$ ranging from 460 nm to 500 nm to fall between 0.9 and 1.05, both inclusive.

According to the above, controller 21 can automatically adjust the output ratio between first light source 11 and second light source 12, based on the spectral reflectance $\rho(\lambda)$ calculated by calculator 22. For this reason, words written on the object are easy to read and discomfort caused by the brightening effect can further be reduced.

Moreover, in illumination device 1 according to present embodiment, controller 21 outputs, based on the spectral reflectance $\rho(\lambda)$ calculated by calculator 22, information indicating the output ratio between first light source 11 and second light source 12 to cause the maximum value of the spectral reflectance $\rho(\lambda)$ at the wavelength $\lambda$ ranging from 460 nm to 500 nm to fall between 0.9 and 1.05, both inclusive.

According to the above, an output of information indicating the output ratio between first light source 11 and second light source 12 enables a user to adjust the output ratio between first light source 11 and second light source 12 based on the information. As a result, words written on the object are easy to read and discomfort caused by the brightening effect can further be reduced.

In addition, in illumination device 1 according to the present embodiment, a correlated color temperature of the white light emitted from second light source 12 is less than or equal to 3500 K.

According to the above, light can be emitted onto the object for a user to, for example, read in a dimly lit space, such as an inside of an aircraft. With this, it is possible to make words on the object easy to read for the user and also to avoid emitting light having a high color temperature onto surrounding people other than the user.

[Other Variations]

Hereinbefore, the illumination device according to the present disclosure has been described based on the above-described embodiments, but the present disclosure is not limited to these embodiments. Embodiments arrived at by a person of skill in the art making various modifications to the embodiments which do not depart from the spirit of the present disclosure may be included in the present disclosure.

For example, in the illumination device according to the above-described embodiments, the measurer may include only the first detector. In this case, an intensity $E_A(\lambda)$ of reflected light reflected off the surface of an object at a wavelength $\lambda$, an intensity $E_p(\lambda)$ of emitted light emitted due to the excitation of a fluorescent brightener at a wavelength $\lambda$, and an intensity $E_r(\lambda)$ of reflected light reflected off the surface of the object containing the fluorescent brightener at a wavelength $\lambda$ may be estimated based on an intensity $E(\lambda)$ of emitted light emitted onto the surface of the object at a wavelength $\lambda$, the type and amount of the fluorescent brightener, and an absorption curve of the fluorescent brightener, etc. Alternatively, the measurer may include only the second detector. In this case, an intensity $E(\lambda)$ of emitted light emitted onto the surface of an object at a wavelength $\lambda$, an intensity $E_p(\lambda)$ of emitted light emitted due to the excitation of a fluorescent brightener at a wavelength $\lambda$, and an intensity $E_r(\lambda)$ of reflected light reflected off the surface of the object containing the fluorescent brightener at a wavelength $\lambda$ may be estimated based on an intensity $E_A(\lambda)$ of reflected light reflected off the surface of the object at a wavelength $\lambda$, the type and amount of the fluorescent brightener, and an absorption curve of the fluorescent brightener, etc.

In addition, in the illumination device according to the above-described embodiments, the calculator may calculate a spectral reflectance $\rho(\lambda)$ according to the type and amount of a fluorescent brightener contained in an object.

Moreover, the controller, etc., included in the illumination device according to the above-described embodiments are each typically implemented as an LSI circuit that is an integrated circuit. These elements may be individually implemented as a single chip, or some or all of the elements may be implemented as a single chip as a whole.

The integrated circuit is not limited to the LSI circuit; the elements may be implemented as a dedicated circuit or generic processor. A field programmable gate array (FPGA) that is programmable after manufacturing of the LSI circuit, or a reconfigurable processor whose circuit cell connections and settings in the LSI circuit are reconfigurable, may be used.

Note that, elements in the illumination device according to the above-described embodiments may be configured as a dedicated hardware product or may be implemented by executing a software program suitable for each element. Each element may be implemented as a result of a program execution unit, such as a CPU or processor or the like, loading and executing a software program stored in a storage medium such as a hard disk or semiconductor memory.

Moreover, all of the figures in the above-described embodiments are used to exemplify the present disclosure in detail, and thus the embodiments of the present disclosure are not limited to the exemplified figures.

The block diagrams illustrate one example of the division of functional blocks, but a plurality of functional blocks may be implemented as a single functional block, a single functional block may be broken up into a plurality of functional blocks, and part of one function may be transferred to another functional block. Moreover, the functions of a plurality of function blocks having similar functions may be processed by a single piece of hardware or software in parallel or by time-division.

The order in which the steps are executed in the flowcharts are mere examples for presenting specific examples of the present disclosure; the orders are not limited to the illustrated orders. Moreover, some of the steps may be executed at the same time as (in parallel with) other steps.

Note that the present disclosure also encompasses: embodiments achieved by applying various modifications conceivable to those skilled in the art to each embodiment; and embodiments achieved by optionally combining the elements and the functions of each embodiment without departing from the spirit of the present disclosure.

The invention claimed is:

1. An illumination device that illuminates an object containing a fluorescent brightener, the illumination device comprising:

a light emitter that emits white light including violet light whose light emission peak wavelength that excites the fluorescent brightener is less than or equal to 405 nm; and a controller, wherein a spectral reflectance $\rho(\lambda)$ is expressed by an intensity $E_A(\lambda)$/an intensity $E(\lambda)$, where the intensity $E_A(\lambda)$ is an intensity of reflected light at a wavelength $\lambda$ and the intensity $E(\lambda)$ is an intensity of emitted light at a wavelength $\lambda$, the reflected light being reflected off a surface of the object, the emitted light being emitted onto the surface of the object containing the fluorescent brightener, and the controller controls:

an output of the light emitter to cause a maximum value of the spectral reflectance $\rho(\lambda)$ at a wavelength ranging from 460 nm to 500 nm to fall between 0.9 and 1.05, both inclusive, and the light emitter to cause the spectral reflectance $\rho(\lambda)$ to fall within a predetermined range, the spectral reflectance $\rho(\lambda)$ being calculated based on the intensity $E_A(\lambda)$ and the intensity $E(\lambda)$.

2. The illumination device according to claim 1, wherein the intensity $E_A(\lambda)$ is a sum of an intensity $E_\rho(\lambda)$ of emitted light at a wavelength $\lambda$ and an intensity Er $(\lambda)$ of reflected light at a wavelength $\lambda$, the emitted light being emitted due to excitation of the fluorescent brightener, the reflected light being reflected off the surface of the object containing the fluorescent brightener.

3. The illumination device according to claim 1, wherein the light emitter includes:

a first light source that emits the violet light; and a second light source that is an individual element different from the first light source, and emits the white light.

4. The illumination device according to claim 3, wherein the first light source includes a light-emitting diode (LED).

5. The illumination device according to claim 3, wherein the first light source includes an LED that emits the violet light, and the second light source includes an LED that emits the white light.

6. The illumination device according to claim 3, wherein the second light source includes an LED that emits blue light whose light emission peak wavelength falls between 450 nm and 470 nm, both inclusive, and a phosphor appropriately selected from among a yellow phosphor, a green phosphor, and a red phosphor which are to be excited by the blue light.

7. The illumination device according to claim 3, wherein the second light source includes an LED that emits blue light whose light emission peak wavelength falls between 450 nm and 470 nm, both inclusive, and a blue phosphor, a green phosphor, and a red phosphor which are to be excited by the blue light.

8. The illumination device according to claim 3, wherein the second light source includes a blue LED that emits blue light whose light emission peak wavelength falls between 450 nm and 470 nm, both inclusive, a green LED that emits green light whose light emission peak wavelength falls between 500 nm and 550 nm, both inclusive, and a red LED that emits red light whose light emission peak wavelength falls between 600 nm and 650 nm, both inclusive.

9. The illumination device according to claim 3, wherein the controller:

individually controls the first light source and the second light source in controlling brightening and dimming of light to be emitted by the first light source and the second light source, and adjusts, according to a type and an amount of the fluorescent brightener contained in the object, an output ratio between the first light source and the second light source to cause the maximum value of the spectral reflectance $\rho(\lambda)$, at the wavelength ranging from 460 nm to 500 nm to fall between 0.9 and 1.05, both inclusive.

10. The illumination device according to claim 9, further comprising:

a measurer that measures the intensity $E(\lambda)$ and the intensity $E_A(\lambda)$; and a calculator that calculates the spectral reflectance $\rho(\lambda)$.

11. The illumination device according to claim 10, wherein the controller adjusts, based on the spectral reflectance $\rho(\lambda)$ calculated by the calculator, the output ratio between the first light source and the second light source to cause the maximum value of the spectral reflectance $\rho(\lambda)$ at the wavelength $\lambda$ ranging from 460 nm to 500 nm to fall between 0.9 and 1.05, both inclusive.

12. The illumination device according to claim 10, wherein the controller outputs, based on the spectral reflectance $\rho(\lambda)$ calculated by the calculator, information indicating the output ratio between the first light source and the second light source to cause the maximum value of the spectral reflectance $\rho(\lambda)$ at the wavelength $\lambda$ ranging from 460 nm to 500 nm to fall between 0.9 and 1.05, both inclusive.

13. The illumination device according to claim 3, wherein a correlated color temperature of the white light emitted from the second light source is less than or equal to 3500 K.

14. An illumination device that illuminates an object containing a fluorescent brightener, the illumination device comprising:

a light emitter that emits white light including violet light whose light emission peak wavelength that excites the fluorescent brightener is less than or equal to 405 nm, wherein the following expression is less than a fixed value: {an integrated value of (a spectral distribution of the violet light out of the white light×a spectral luminous efficiency curve)}/{an integrated value of (a spectral distribution of light emitted by the light emitter×a spectral luminous efficiency curve)}, and the following expression is more than or equal to a fixed value: {an integrated value of (the spectral distribution of the violet light out of the white light×an absorption curve of the fluorescent brightener)}/{an integrated value of (the spectral distribution of the light emitted by the light emitter×the absorption curve of the fluorescent brightener)}.

15. An illumination device that illuminates an object containing a fluorescent brightener, the illumination device comprising:

a light emitter that emits white light including violet light whose light emission peak wavelength that excites the fluorescent brightener is less than or equal to 405 nm, wherein a ratio k of a radiant flux of the violet light to a total radiant flux is expressed by the following Expression (1), where Φp denotes an intensity of the violet light at a wavelength $\lambda$ and Φw denotes the intensity of the white light at a wavelength $\lambda$, the violet light being included in the white light emitted from the light emitter, the white light being emitted from the light emitter:

[Math. 1]

$$k = \frac{\int_{380}^{780} \phi_p(\lambda)}{\int_{380}^{780} \phi_w(\lambda) + \int_{380}^{780} \phi_p(\lambda)}, \quad \text{Expression (1)}$$

and the ratio K of the radiant flux of the violet light to the total radiant flux falls between 0.02 and 0.2, both inclusive.

* * * * *